United States Patent [19]

Wells et al.

[11] 4,149,639

[45] Apr. 17, 1979

[54] TWO-POSITION TRIP ARM

[75] Inventors: J. Dwayne Wells, Selma; L. Dennis Butler, Kingsburg, both of Calif.

[73] Assignee: Sperry Rand Corporation, New Holland, Pa.

[21] Appl. No.: 891,870

[22] Filed: Mar. 30, 1978

[51] Int. Cl.² .................. A01D 87/12; B65G 57/32
[52] U.S. Cl. ........................... 214/40; 198/374; 414/64; 414/502
[58] Field of Search ............... 214/6 B, 6 C, 6 P, 518, 214/519, 520, 521, 522; 198/374, 457

[56] References Cited

U.S. PATENT DOCUMENTS

| | | | |
|---|---|---|---|
| 3,395,814 | 8/1968 | Grey | 214/6 B |
| 3,446,369 | 5/1969 | May et al. | 214/6 B |
| 3,664,519 | 5/1972 | Grey | 214/6 B |
| 3,687,302 | 8/1972 | Castro | 214/6 B |
| 3,901,393 | 8/1975 | Butler et al. | 214/6 B |
| 3,920,133 | 11/1975 | Butler et al. | 214/6 B |
| 3,942,651 | 3/1976 | Neely | 214/6 B |

*Primary Examiner*—L. J. Paperner
*Attorney, Agent, or Firm*—John B. Mitchell; Frank A. Seemar; Ralph D'Alessandro

[57] ABSTRACT

A bale wagon having a bale-receiving area, a bale-accumulating area, means for transferring bales from the bale-receiving area to the bale-accumulating area, and an improved means for sensing the location of bales on the bale-receiving area and activating the means for transferring is disclosed. The improved sensing and activating means includes a cantilevered arm pivotable about a vertical axis between first and second predetermined sensing locations. A follower fixed to the arm and movable therewith either activates a sensor after a predetermined amount of radial movement corresponding to the second sensing location, or engages a spacer which is caused to activate the sensor after another smaller amount of radial movement corresponding to the first sensing location.

14 Claims, 4 Drawing Figures

TWO-POSITION TRIP ARM

BACKGROUND OF THE INVENTION

This invention relates generally to bale wagons, and specifically to a two-position trip arm for sensing the presence of bales in either a first or second location on the bale-receiving area of a bale wagon and activating a transfer means.

Over the past years, the three-table bale wagons, such as that disclosed in U.S. Pat. No. 2,848,127 to G. E. Grey has become by far the most successful commercial apparatus of its kind. From a study of the Grey patent referred to above, one will readily appreciate that the bale wagon shown therein includes three tandemly arranged tables, each pivotally mounted about a transverse axis relative to the longitudinal center line of the wagon. Bales of hay are picked up from the field and conveyed onto a first receiving table which pivots upwardly about its transverse axis to deposit the bales on a rearwardly disposed transfer table. The receiving table continues to receive bales and deposit the bales received on the transfer table until a tier of bales has been accumulated thereon. Once a full tier of bales has been accumulated on the transfer table, the transfer table is pivoted upwardly about its transverse axis, causing the tier of bales to be deposited on a rearwardly disposed load bed. The transfer table continues to function as a bale-accumulator, and continues to deposit the tiers formed thereon in succession on said load bed until a stack of bales is formed thereon, the stack being comprised of a series of side-by-side tiers. Once the stack has been formed on the load, the wagon can then deposit the entire stack on the ground or on some other storage surface by pivoting the load bed about its transverse axis.

Another type of bale wagon demonstrated to successfully and efficiently form stacks of bales is disclosed, for example, in co-pending U.S. Patent Application Ser. No. 891,890, entitled "Bale Wagon" filed concurrently herewith in the name of L. D. Butler and assigned to the same assignee as the instant application. The application mentioned immediately above is hereby expressly incorporated herein in its entirety by reference. This bale wagon, though somewhat similar to the above-described Grey-type bale wagon, has a bale-receiving area which is stationary and at substantially the same height as the tier-forming table. Instead of a pivoting first table the bales are pushed across the bale-receiving area onto the tier-forming table by a horizontal pusher mechanism. The machine tier-forming table and a load rack then function substantially as described in the Grey patent, and generally known in the art.

The overall objective of a bale wagon is to form a uniform stack which is stable and permits the bales to weather in a proper manner. In order to enhance the stability of the stack, it is generally desirable to provide one or more tie tiers within the stack, such being tiers having individual bales arranged to overlap two bales in adjacent tiers above and below the tie tier. In the more conventional Grey-type automatic bale wagon, the formation of one or more tie tiers is accomplished during the formation of the stack on the bale wagon through utilization of a mechanization which is similar to that illustrated and described in U.S. Pat. No. 3,395,814. In the above-identified incorporated application, the tiers are formed partly through the use of swing arms which engage in-line bales and pivot them through approximately 90°.

That portion of the tier forming process which is of importance to the instant invention relates to the ability of the wagon control system to sense the position of a single bale at the center portion of the bale-receiving means or, in the alternative, the full-load position of the bale-receiving means. As shown and described in the above noted U.S. Pat. No. 3,395,814 and in U.S. Pat. No. 3,901,393, the formation of standard tier patterns require activation of the transfer means only when the bale-receiving means is completely loaded, and the formation of the tie tiers requires the same ability, plus the ability to sense the locations of a single bale in the center of the bale-receiving means. In known machines, either two sensing means have been employed on the bale-receiving means or the operator has been required to activate the transfer means upon visual observation of bale location.

The invention to be described below permits complete control and sensing of bale position on the bale-receiving means in a manner which increases the overall efficiency of the automatic formation of tied stacks.

SUMMARY OF THE INVENTION

It is an object of the instant invention to provide a bale wagon with means for automatically forming a tie tier.

It is another object of the instant invention to provide an improved means for sensing the presence of bales at specific locations on the bale-receiving area of a bale wagon.

It is another object of the instant invention to provide means for sensing the presence of bales at first and second locations on a bale-receiving means of a bale wagon and activating a transfer mechanism.

It is a further object of the instant invention to provide a means for sensing the presence of bales which is manually selectible to sense two specific locations and activate a bale-transfer means.

These and other objects are attained according to the instant invention by providing a bale wagon with a bale-receiving area, a bale-accumulating area, means for transferring the bales from the bale-receiving area to the bale-accumulating area, and an improved means for sensing the location of bales on the bale-receiving area and actuating the means for transferring. The improved sensing and activating means includes a cantilevered arm pivotable about a vertical axis between first and second predetermined sensing locations. A follower fixed to the arm and movable therewith either activates the sensor after a predetermined amount of radial movement corresponding to the second sensing location, or engages a spacer which is caused to activate the sensor after another smaller amount of radial movement corresponding to the first sensing location.

BRIEF DESCRIPTION OF THE DRAWINGS

For a better understanding of the invention, as well as other objects and further features thereof, reference is made to the following detail disclosure of the invention taken in conjunction with the accompanying drawings wherein.

DESCRIPTION OF THE PREFERRED EMBODIMENT

Figure 1:
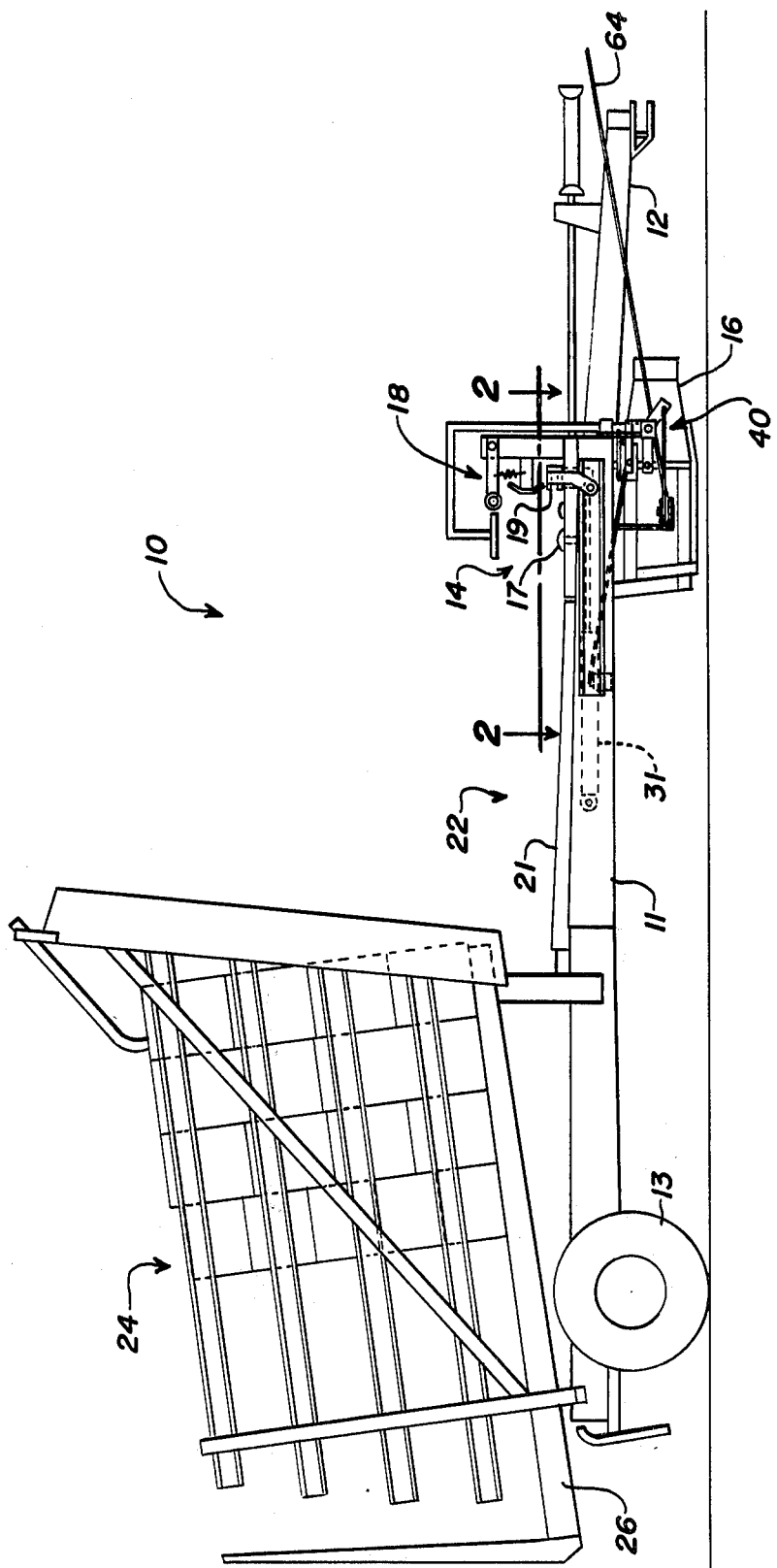
FIG. 1 is a side elevational view of a bale wagon employing the concepts of the instant invention.
Figure 2:
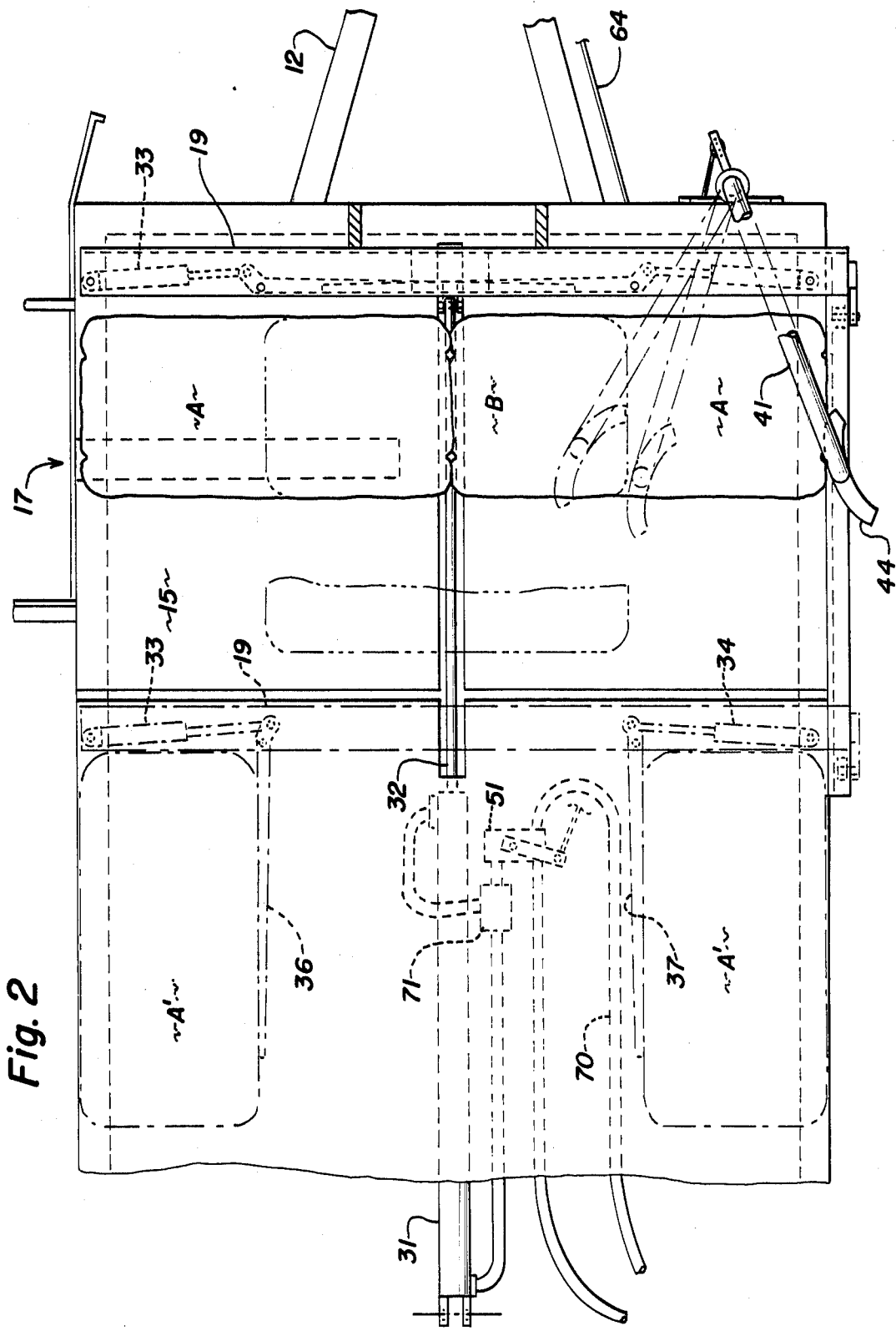
FIG. 2 is a top plan view of the bale wagon of FIG. 1 showing the bale sensing positions of the bale engaging member of the instant invention.

Referring to FIG. 1, a general description of a bale wagon with which the instant invention may be advantageously employed will be given. Bale wagon 10 comprises a main frame 11 extending from the rear toward the front of the wagon, terminating in a tongue 12 adapted to be affixed to a tractor or similar vehicle. The frame 11 is supported rearwardly by a pair of opposing wheels, only one of which, 13, is shown. A bale-receiving area 14 comprises a table-like surface 15 (see FIG. 2) upon which bales are serially deposited by conventional loader 16. A cross conveyor 17 having flights space therealong engages the bales as they are loaded and moves them in line toward the opposing end of surface 15.

An elongate pusher mechanism 19 extends transversely of surface 15 and, through the actuation of cylinder 31 and ram 32 (best seen in FIG. 2) traverses the surface 15 to engage bales thereon and moves them rearwardly.

A bale-accumulating surface 21, comprised of a table 22 is positioned rearwardly of and adjacent the bale support area 14. Table 22 is pivotable about the rear end thereof in a manner taught in the Grey and other like patents described above. A pair of side rails (not shown) may be affixed to the main frame 11 to extend upwardly along the sides of table 22 to prevent bales deposited thereon from making undesirable movements in a side direction.

At the rearmost portion of the wagon 10, there is positioned a stack forming region generally shown at 24. The stack forming mechanism shown is also in the prior art and is comprised primarily of a table 26 which is pivotally mounted to the main frame 11. Tables 22 and 26 operate in the fashion known in the prior art.

Generally, in operation, bales are picked up by the loader 16 serially and deposited on edge in a line on bale-receiving area 14. When the proper number of bales are in alignment, usually two, pusher 19 is activated to engage the bales and push them onto the forward portion of table 22. This process is repeated until table 22 reaches its capacity. Then, table 22 pivots to deposit the tier of bales on the load rack 24 where they are held substantially stationary. The entire process is repeated until the load rack contains a predetermined number of bales. Load rack 24 may then be pivoted to deposit the stack on the ground behind the wagon.

As further described in the above-incorporated copending patent application, various tie tier formations may be easily assembled by the structure shown. Bales are deposited on edge, as depicted by bales "A" in FIG. 2, on the bale-receiving area 14, but must be rotated 90° before transfer to the second table and inclusion in a tie tier. The pusher mechanism 19 works in conjunction with bale-turning apparatus 18 to rotate the bales onto their flat sides. Then, they may be either pushed directly onto the front portion of table 22 or pivoted 90° by the actuation of cylinders 30 and 31, which causes swing arms 32 and 33 to engage the bales, and pushed onto table 22 in the rail bale positions designated "A'". Center bales are then positioned between rails bales A' by loading a single bale onto the bale-receiving area 14 and positioning it at location "B". It too is then rotated 90° and pushed onto table 22. This procedure is then repeated a sufficient number of times to completely load the table.

The primary objective of the apparatus of the instant invention is to sense the presence of a bale at the two locations mentioned and to thereby activate the pusher cylinder 31 so that it will engage bales on the receiving surface 15 and transfer them to the second table 22. More specifically, with reference to FIG. 2, it is desirable to detect the presence of a bale at the position shown as "A", which in fact means that there are two bales in line on the bale-receiving area. It is further desirable to detect the presence of a bale at the position shown at B in dotted line, which is the central location on the bale-receiving means.

Figure 3:
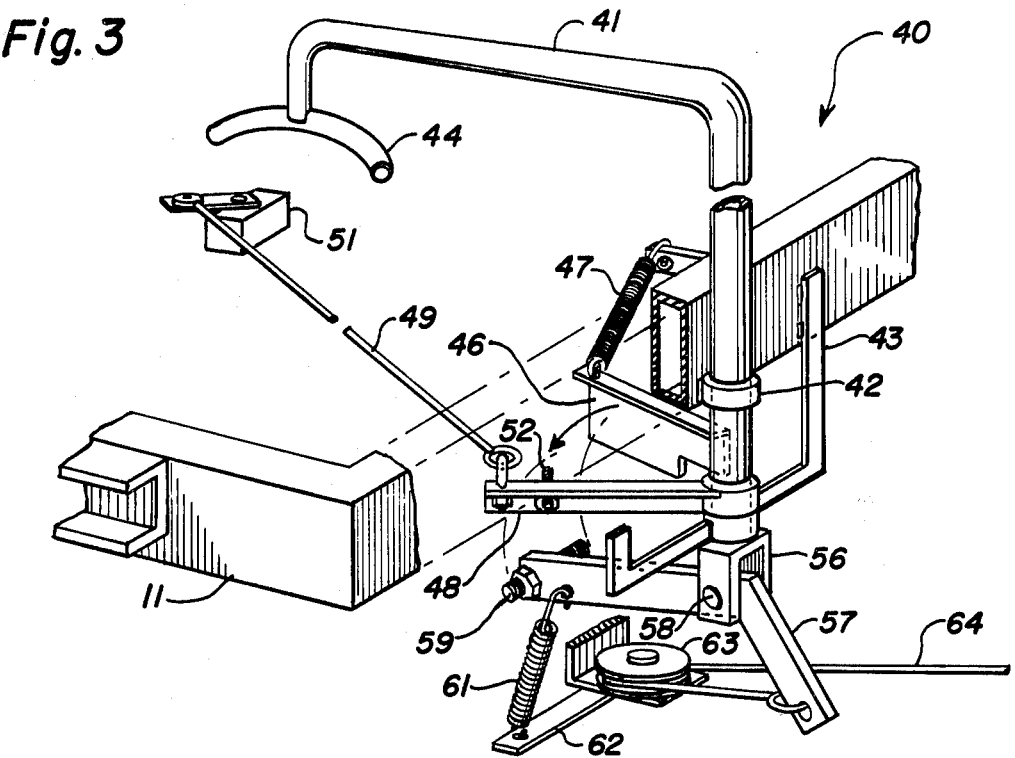
FIG. 3 is an exploded perspective view of the apparatus of the instant invention.
Figure 4:
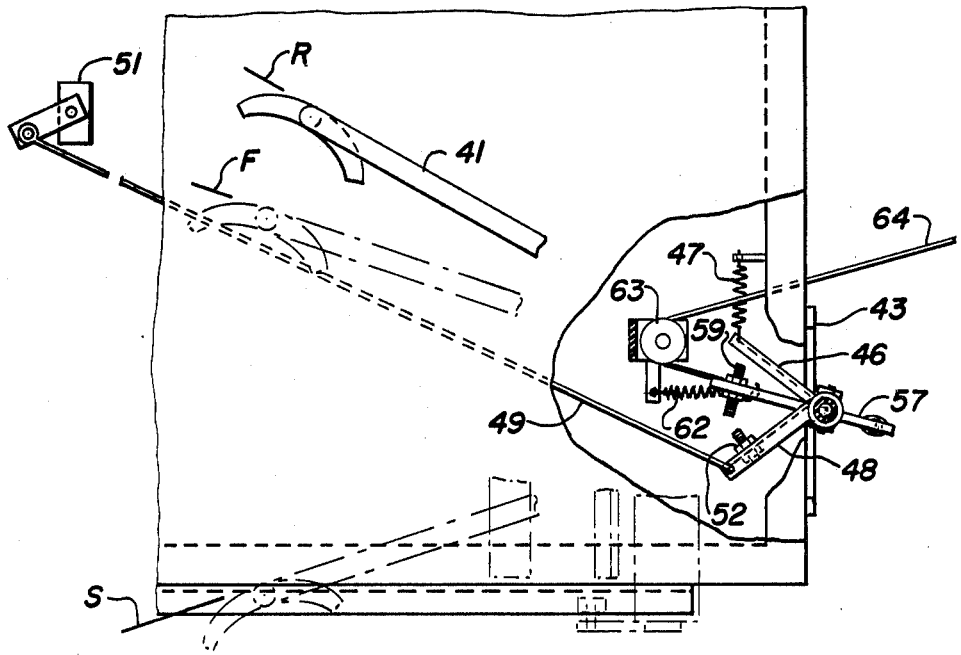
FIG. 4 is a top plan view of the apparatus of FIG. 3.

Referring now more specifically to FIGS. 3 and 4, the detail structure of the sensing means 40 of the instant invention will be described. A cantilevered somewhat inverted U-shaped contact arm 41 is secured for pivotable movement about a vertical axis to main frame 11 by a bearing 42 and a bracket 43. The inboard end of arm 41 terminates in a substantially horizontal curved bale-engaging bar 44. As can be seen more readily in FIG. 2, the arm 41 extends rearwardly across the bale-receiving area of surface 15, with the bale-engaging bar 44 positioned at a height to interfere with, or engage, bales on edge as they are moved across the bale-receiving area by conveyor 17.

An actuation member 46, shaped somewhat like a vertical paddle, is affixed to arm 41 and moves through an arcuate path as the arm is rotated. Actuation member 46, and thus arm 41, is biased toward the bale-receiving end of the bale-receiving area by a spring 47. A sensor 48, in the shape of an elongate arm, is rotatably affixed to the vertical portion of arm 41. The outboard end of sensor 48 is affixed via rod 49 to control valve 51, the function of which will be described below. Sensor 48 includes a bolt 52 which is threadably engaged therewith to extend substantially horizontally toward actuation member 46. The bolt 52 may be adjusted relative to sensor 48 to thereby modify the distance through which member 46 must travel for contact therewith. As can be seen, when arm 41 rotates in a counterclockwise direction, actuation member 46 moves therewith. When the member 46 contacts bolt 52, it causes sensor 48 to also move in a counterclockwise direction, thus pulling rod 49 and actuating valve 51.

Arm 51 terminates at the lower end thereof with a bracket 56 which rotatably supports an angular spacer support arm 57 about pin 58. A spacer 59, in the form of a bolt threadably engaged with the end of spacer support arm 57, is thus movable from the position shown in FIG. 3 upwardly into an interference between actuation member 46 and bolt 52 of sensor 48. Support arm 57 is biased downwardly at the spacer end by a spring 61 affixed to a brace 62 which is, in turn, fixed to main frame 11. A pulley 63 directs a manual control cable 64 to the end of support arm 57 opposite spacer 59.

In operation, arm 41 is in the rest position shown as "R" in FIG. 4. The elements of the trip mechanism 40 are generally in the positions shown in FIG. 3, and the operator is intending to sense the presence of two bales on the bale-receiving means. The first bale is picked up from the ground and deposited on the cross conveyor 17 for movement across bale-receiving area 15. The bale engages bar 44 and moves the arm 41 to the first position shown as "F" in FIG. 4. A second bale is picked up from the ground and deposited on the cross conveyor 17 which moves the initial bale further across surface 15 until the arm 44 is in the second position shown as "S" in FIG. 4. At this time, the actuation member 46 engages bolt 52 and causes sensor 48 to rotate about its vertical axis of rotation and valve 51 to be actuated. By referring briefly to FIG. 2, it can be seen that the high pressure input line 70 allows fluid to flow through valve 51 and onto selector control valve 71. As taught in the above-identified incorporated co-pending patent application, selector valve 71 allows fluid to flow into cylinder 31 and thus cause pusher 19 to engage the bales and move them rearwardly onto the forward portion of the second table.

If it is desired to sense the position of a single bale on the bale-receiving means, cable 64 is pulled, causing arm 57 to rotate about pin 58 and spacer 59 to move upwardly into position between actuation member 46 and bolt 52 of sensor 48. A stop may be provided to insure proper interpositioning of the spacer. The bale is then deposited on the bale-receiving area in the normal fashion where it will first engage the arm 41 at position "R" of FIG. 3 and move it to the first position "F" at which time the actuation member 46 engages spacer 59 which in turn engages bolt 52 and actuates valve 51 for operation of cylinder 31.

Thus, it can be seen that the operator has a complete and simple control for determining when the pusher mechanism should be operated to transfer bales onto the tier-forming table for the formation of various tie or standard tiers.

It will be understood that various other changes in the details, materials and arrangement of parts which have been herein described and illustrated in order to explain the nature of the invention will occur to and may be made by those skilled in the art, upon a reading of this disclosure, and such changes are intended to be included within the principles and scope of this invention.

For example, the sensor 48 is shown as being mechanically connected to valve 51; however, one of skill in the art will readily understand that an electrical switch could be added to member 48 for electrical activation of the valve.

Also, one of skill in the art will appreciate that contact arm 41 need not necessarily rotate about a vertical axis, but rather could be L-shaped and rotate about a horizontal axis. Such an arrangement would be operably equivalent to that shown, though perhaps not quite as structurally compact.

Having thus described the invention, what is claimed is:

1. In a bale wagon having a mobile chassis, a bale-accumulating means on said chassis, a bale-receiving means on said chassis adjacent said bale-accumulating means, means for transferring bales from said bale-receiving means to said bale-accumulating means, means for sensing the presence of bales in first and second locations on said bale-receiving means and activating said means for transferring, and means for depositing bales serially onto said bale-receiving means, the improvement in said means for sensing and activating comprising:
   a cantilevered contact arm pivotable about an axis from at least said first location to said second location;
   an actuation member fixed to said contact arm and pivotable therewith;
   first biasing means urging said contact arm towards said first location;
   sensor means operably connected to said transfer means to cause same to cycle, said sensor means located in the path of travel of said actuation member and responsive to the movement thereof to activate said transfer means; and
   a spacer selectively movable from a first position between said actuation member and said sensor means and a second position remote therefrom, whereby said sensor means will activate said transfer means when said contact arm is in said first location only if said spacer is in said first position and said sensor means will activate said transfer means when said contact arm is in said second location only if said spacer is in said second position.

2. The bale wagon of claim 1 wherein said contact arm has a vertical portion through which the arm is pivotable, and said actuation member is fixed thereto.

3. The bale wagon of claim 2 wherein said sensor means comprises an elongate member mounted on said vertical portion of said contact arm and rotatable relative thereto, said elongate member being at least partly in the path of movement of said actuation member.

4. The bale wagon of claim 3, wherein said elongate member is connected to said means for transferring whereby movement of said elongate member causes said means for transferring to cycle.

5. The bale of claim 4 wherein said spacer is affixed to said vertical position of said contact arm and selectively pivotable from said first position to said second position.

6. The bale wagon of claim 5 further including a second biasing means urging said spacer toward said second position.

7. The bale wagon of claim 1 wherein said sensor is an electrical switch operably connected to activate said means for transferring.

8. In a bale wagon having a bale-receiving area, a bale-accumulating area, means for transferring bales from said bale-receiving area to said bale-accumulating area, means for sensing the presence of bales in first and second locations on said bale-receiving area and activating said means for transferring, and means for depositing bales serially onto said bale-receiving area for selective movement therealong in a predetermined path of travel which includes said first and second locations, the improvement in said means for sensing and activating comprising:
   a cantilevered contact arm extending above at least a portion of said predetermined path of travel, said contact arm being pivotable about an axis from at least said first location to said second location;
   an actuation member fixed to said contact arm and pivotable therewith;
   sensor means operably connected to said transfer means to cause the same to cycle, said sensor means located in the arcuate path of travel of said actuation member and responsive to the movement thereof to activate said transfer means; and
   a spacer selectively movable from a first position between said actuation member and said sensor means and a second position remote therefrom, whereby said sensor means will activate said transfer means when said contact arm is in said first location only if said spacer is in said first position and said sensor means will activate said transfer means when said contact arm is in said second location only if said spacer is in said second position.

9. The bale wagon of claim 8 wherein said contact arm has a vertical portion through which the arm is pivotable, and said actuation member is fixed thereto.

10. The bale wagon of claim 9 wherein said sensor means comprises an elongate member mounted on said vertical portion of said contact arm and rotatable relative thereto, said elongate member being at least partly in the path of movement of said actuation member.

11. The bale wagon of claim 10 wherein said elongate member is connected to said means for transferring whereby movement of said elongate member causes said means for transferring to cycle.

12. The bale wagon of claim 11 wherein said spacer is affixed to said vertical portion of said contact arm and selectively pivotable from said first position to said second position.

13. The bale wagon of claim 12 further including a second biasing means urging said spacer toward said second position.

14. The bale wagon of claim 8 wherein said sensor is an electrical switch operably connected to activate said means for transferring.

* * * * *